(12) United States Patent
Govekar et al.

(10) Patent No.: US 7,762,089 B2
(45) Date of Patent: Jul. 27, 2010

(54) REFRIGERANT CHARGING SYSTEM AND METHOD USING VAPOR-PHASE REFRIGERANT

(75) Inventors: Craig F. Govekar, Gurnee, IL (US); Dean P. Pfefferle, Elgin, IL (US); Larry G. Moller, Harvard, IL (US); Anwar Suharno, Barrington, IL (US); Ken R. Meldahl, Fox Lake, IL (US)

(73) Assignee: SPX Corporation, Charlotte, NC (US)

( * ) Notice: Subject to any disclaimer, the term of this patent is extended or adjusted under 35 U.S.C. 154(b) by 423 days.

(21) Appl. No.: 10/990,413

(22) Filed: Nov. 18, 2004

(65) Prior Publication Data

US 2006/0101834 A1 May 18, 2006

(51) Int. Cl.
*F25B 45/00* (2006.01)

(52) U.S. Cl. .................. 62/77; 62/149; 62/292
(58) Field of Classification Search .......... 62/149, 62/292, 77
See application file for complete search history.

(56) References Cited

U.S. PATENT DOCUMENTS

| | | | |
|---|---|---|---|
| 3,785,163 A * | 1/1974 | Wagner, William | 62/77 |
| 4,365,482 A | 12/1982 | Langgard et al. | |
| 5,317,903 A | 6/1994 | McClelland et al. | |
| 5,392,825 A * | 2/1995 | Mims et al. | 137/614.2 |
| 5,406,806 A | 4/1995 | Ricketts et al. | |
| 5,758,506 A * | 6/1998 | Hancock et al. | 62/77 |
| 6,202,433 B1 * | 3/2001 | Murray et al. | 62/292 |
| 6,339,931 B1 * | 1/2002 | Cull | 62/77 |
| 7,104,075 B2 * | 9/2006 | Meeker | 62/77 |
| 2002/0112490 A1 | 8/2002 | Gong | |
| 2002/0124883 A1 * | 9/2002 | Zheng et al. | 137/240 |
| 2006/0010888 A1 * | 1/2006 | Suharno et al. | 62/149 |

FOREIGN PATENT DOCUMENTS

| | | |
|---|---|---|
| JP | 2001-74342 A | 3/2001 |
| JP | 2001-324097 | 11/2001 |

OTHER PUBLICATIONS

Denso Corporation the 37th Tokyo Motor Show 2003, "World's First $CO_2$ Air Conditioning System." http://www.denso.co.jp/motorshow/2003/en/pressktt/product_world/ pp. 1-5.
EPO International Preliminary Report on Patentability; International Application No. PCT/US2005/033925; Dec. 27, 2006.

* cited by examiner

*Primary Examiner*—William E Tapolcai
(74) *Attorney, Agent, or Firm*—Baker & Hostetler LLP

(57) ABSTRACT

A refrigerant charging system and method for charging a refrigeration system with a vapor-phase refrigerant includes a refrigerant source, an input line, a sensor and a pressure regulator. The input line connects the refrigerant source to the refrigeration system. One or more valves are disposed between the refrigerant source and refrigeration system to regulate the pressure of the refrigerant being introduced into the refrigeration system, and the sensor measures the pressure of the refrigerant entering the refrigeration system. A pressure regulator can also be used to regulator the flow of refrigerant. Once the pressure of the refrigerant reaches a predetermined pressure, the refrigeration system is fully charged, and the transfer of refrigerant to the refrigeration system is stopped. The system and method are used to charge the refrigeration system of, e.g., an automotive vehicle, and the refrigeration is carbon dioxide.

5 Claims, 2 Drawing Sheets

REFRIGERANT CHARGING SYSTEM AND METHOD USING VAPOR-PHASE REFRIGERANT

TECHNICAL FIELD

The disclosure relates generally to refrigerant charging systems and, more specifically, to a high precision, vibration-resistant refrigerant charging system.

BACKGROUND ART

Most refrigeration systems are not 100% free of leaks. Thus, the amount (or mass) of refrigerant within the refrigeration system decreases over time. Refrigeration systems, however, are designed to operate with a specific amount of refrigerant. Therefore, loss of refrigerant in a refrigeration system over time typically reduces the efficiency of the refrigeration system. Also, if the amount of refrigerant in the refrigeration system drops to a certain level, the refrigeration system may cease to operate and/or be damaged. For these reasons, a common maintenance operation for a refrigeration system is to recharge the refrigerant within the refrigeration system.

The recharging operation typically involves flushing the refrigeration system of any remaining refrigerant and, if present, other materials within the refrigeration system. Once the refrigeration system is flushed, a predetermined amount of new refrigerant is introduced into the refrigeration system. An important component of conventional refrigeration charging systems is the device that measures the amount of refrigerant introduced into the refrigeration system. Since the refrigeration system is designed to operate with a specific amount of refrigerant, too little or too much refrigerant can reduce the effectiveness of the recharging operation.

One conventional device used to measure the amount of refrigerant introduced into the refrigeration system is a load cell (or scale). Essentially, the load cell measures the weight of a tank containing the refrigerant before the refrigerant is introduced into the refrigeration system and then afterwards. The difference between the two readings is the amount of refrigerant introduced into the refrigeration system. There are, however, certain problems that are associated with the use of a load cell in conventional recharging systems. Load cells are sensitive to vibration, which can throw off the measurements. Also, since the load cell determines the weight of the entire tank used to supply the refrigerant, which can weigh several hundred pounds or more, sensitivity of the load cell is reduced.

The recharging of refrigeration systems has been complicated by the changes in refrigeration systems and refrigerants used in the refrigeration systems. Recently, the refrigerant in automobile air conditioning systems has been switched from chlorofluorocarbon 12 (CFC-12) to hydrofluorocarbon 134a (HFC-134a) for the purpose of ozone layer protection. However, HFC-134a is considered to be a contributor to global warming, and new types of refrigerant are being considered, of which carbon dioxide ($CO_2$) is one. Compared to HFC-134a, carbon dioxide only has about $\frac{1}{1300}$ the global warming potential. However, the use of carbon dioxide presents issues not seen with conventional refrigeration systems. For example, carbon dioxide has an operation pressure that is 7 to 10 times higher than that of HFC-134a. The resulting increase in pressure necessitates thicker walls for the equipment handling the carbon dioxide, such as the storage tank for the refrigeration recharging system. These thicker walls add additional weight to the tank, which further exacerbates the previously discussed problems, such as the sensitivity of the load cell.

Another conventional device used to measure the amount of refrigerant introduced into the refrigeration system employs mass flow technology. As recognized by those skilled in the art, mass flow technology implements a sensor that measures the flow rate of fluid (i.e., the refrigerant) flowing past a certain point. However, use of mass flow technology is very expensive, and the expense is even greater when an increased sensitivity for calculating the amount of refrigerant delivered is desired. The accuracy of mass flow technology is dependent on the fluid state since the mass flow sensor does not measure gas as well as liquid. Although most refrigerants are in a liquid form during the recharging operation, carbon dioxide is in a gaseous state during a recharging operation. Also, mass flow technology does not work well with two-phase fluids. Thus, when carbon dioxide, or another gaseous refrigerant, is used, the sensitivity of the mass flow technology is reduced. There is, therefore, a need for a refrigerant charging system and method that is more accurate and vibration-resistant, and less expensive than conventional refrigeration charging systems, particularly when the refrigerant is a gaseous refrigerant such as carbon dioxide.

SUMMARY OF THE DISCLOSURE

Described is a system and method for charging a refrigeration system with a vapor-phase refrigerant. The charging system includes a refrigerant source, an input line, a sensor and a control valve. The input line connects the refrigerant source to the refrigeration system. The control valve regulates the flow and pressure of the refrigerant being introduced into the refrigeration system, and the pressure sensor measures the pressure of the refrigerant entering the refrigeration system. Once the pressure of the refrigerant reaches a predetermined pressure, the refrigeration system is fully charged, and the transfer of refrigerant to the refrigeration system is stopped. The refrigerant may be a gaseous, such as carbon dioxide.

Additional advantages will become readily apparent to those skilled in the art from the following detailed description, wherein only an exemplary embodiment of the present invention is shown and described, simply by way of illustration of the best mode contemplated for carrying out the present invention. As will be realized, the disclosure is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENTS

Figure 1:
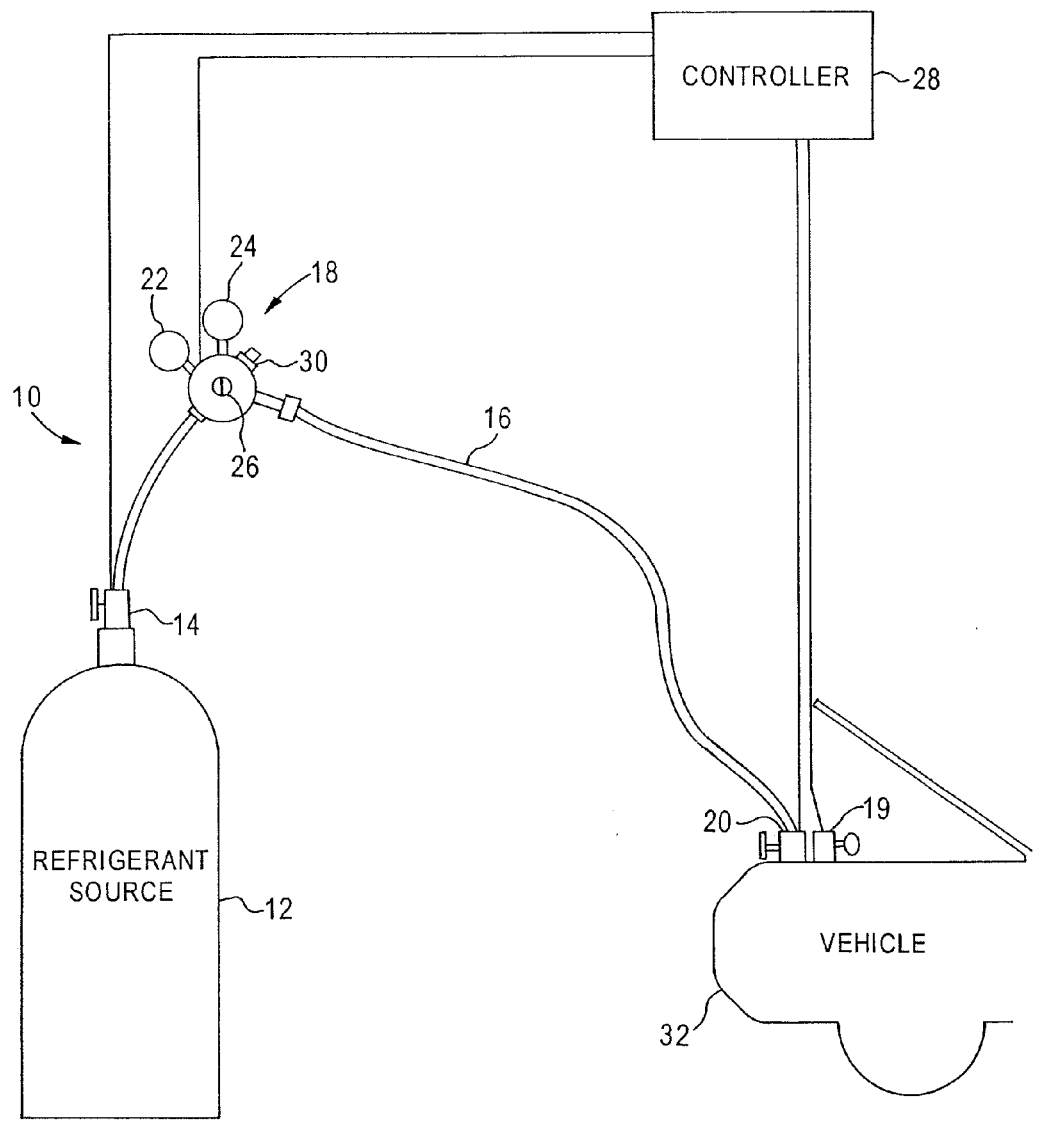
FIG. 1 is a schematic view of a refrigerant charging system, according to the disclosure.

An example of a refrigerant charging system 10 is illustrated in FIG. 1. The refrigerant charging system includes a refrigerant source 12, an input line 16, a sensor 19 and a control valve 14 for controlling the flow of refrigerant from the refrigerant source 12 through the input line 16. The input line 16 fluidly connects the refrigerant source 12 to a refrigeration system of the vehicle 32. The input line 16 may also include an exit control valve 20 for controlling the flow and pressure of refrigerant from the input line 16 to the refrigeration system of the vehicle 32. The refrigerant charging system 10 may include a pressure regulator 18 that is used in place of the control valve 20 to control the flow of refrigerant to the refrigeration system. Alternatively, the pressure regulator 18 may be used in addition to the exit control valve 20.

The refrigerant source 12 is not limited as to a particular type of source for providing refrigerant. However, in a current aspect of the refrigerant charging system 10, the refrigerant source 12 is a constant-volume tank.

The sensor 19 measures the pressure and/or temperature of the refrigerant being introduced into the refrigeration system, and the sensor 19 is not limited to a particular location. For example, the sensor may be located along the line 16 anywhere between the pressure regulator 18 and the refrigeration system. Alternatively, as illustrated in FIG. 1, the sensor 19 may be directly connected to the refrigeration system. The use of a sensor 19 to measure pressure and/or temperature of a fluid within the refrigeration system, and the refrigerant charging system 10 is not limited as to any particular type or configuration of temperature and/or pressure sensor 19. The sensor 19 may also be configured to adjust a measured value of the pressure of the refrigerant based upon a measured temperature of the refrigerant. For example, if the measured temperature of the refrigerant varies from a preset baseline temperature, the sensor 19 may adjust the measured pressure upwards or downwards to indicate the pressure the refrigerant would be at if the refrigerant was measured at the baseline temperature.

Many different types of pressure regulators 18 exist that are capable of regulating the pressure of a vapor-phase refrigerant, and the refrigerant charging system 10 is not limited to any particular type of pressure regulator 18 so capable. A common pressure regulator 18 includes a pressure adjustor 26 and a low-pressure-side gauge 24 that respectively adjusts and monitors the pressure of the refrigerant leaving the pressure regulator 18. The pressure regulator 18 may also include a high-pressure-side gauge 22 that indicates the pressure of the refrigerant entering the high-pressure-side of the pressure regulator, which in this case is the pressure of the refrigerant in the refrigerant source 12. The pressure regulator 18 may include a safety-valve 30 that activates when pressure on the low-pressure-side of the pressure regulator 18 exceeds a certain predetermined pressure.

The refrigerant charging system 10 can optionally include a controller 28 connected to the sensor 19, the pressure regulator 18 and/or the control valves 14, 20. Although the control valves 14, 20 and pressure regulator 18 can be operated manually, the controller 28 may be used to automatically control the operation of these devices. Additionally, information from the sensor 19 can be sent to the controller 28, either automatically or manually, and the controller 28 may use this information during the control of the control valves 14, 20 and the pressure regulator 18.

In an aspect of the refrigerant charging system 10, the refrigerant to be introduced into the refrigeration system of the vehicle 32 is in a vapor-phase during the recharging operation. An example of such a refrigerant is carbon dioxide. The pressure regulator 18 acts to maintain the pressure downstream of the pressure regulator 18 to be no greater than a particular predetermined pressure, which is based upon a pressure of refrigerant in the refrigeration system needed to completely charge the refrigeration system. Instead of determining when a refrigeration system has been charged based upon the amount of refrigerant by weight/mass introduced into the refrigeration system, as was done with prior charging systems, the present refrigeration charging system 10 charges the refrigeration system based upon the pressure of the refrigerant in the refrigeration system.

Since prior charging systems are used for liquid-phase refrigerants, a pressure regulator was not used in these systems to determine the amount of refrigerant charged into the refrigeration system because the pressure regulator would not be capable of reliably determining the correct amount of refrigerant. At a given temperature, a liquid refrigerant has a particular vapor pressure. Once the vapor pressure has been met, no matter how much additional refrigerant is added, as long as the temperature remains constant, the measured pressure (i.e., the vapor pressure) also remains constant. Therefore, the pressure of the refrigerant is not used in calculating the amount of liquid refrigerant added because at a certain point, the measured pressure remains the same even while refrigerant is being added. In contrast, a refrigerant, such as carbon dioxide, remains gaseous at operational temperature/pressure combinations; and thus, the addition of refrigerant will increase the pressure of the refrigerant.

Figure 2:
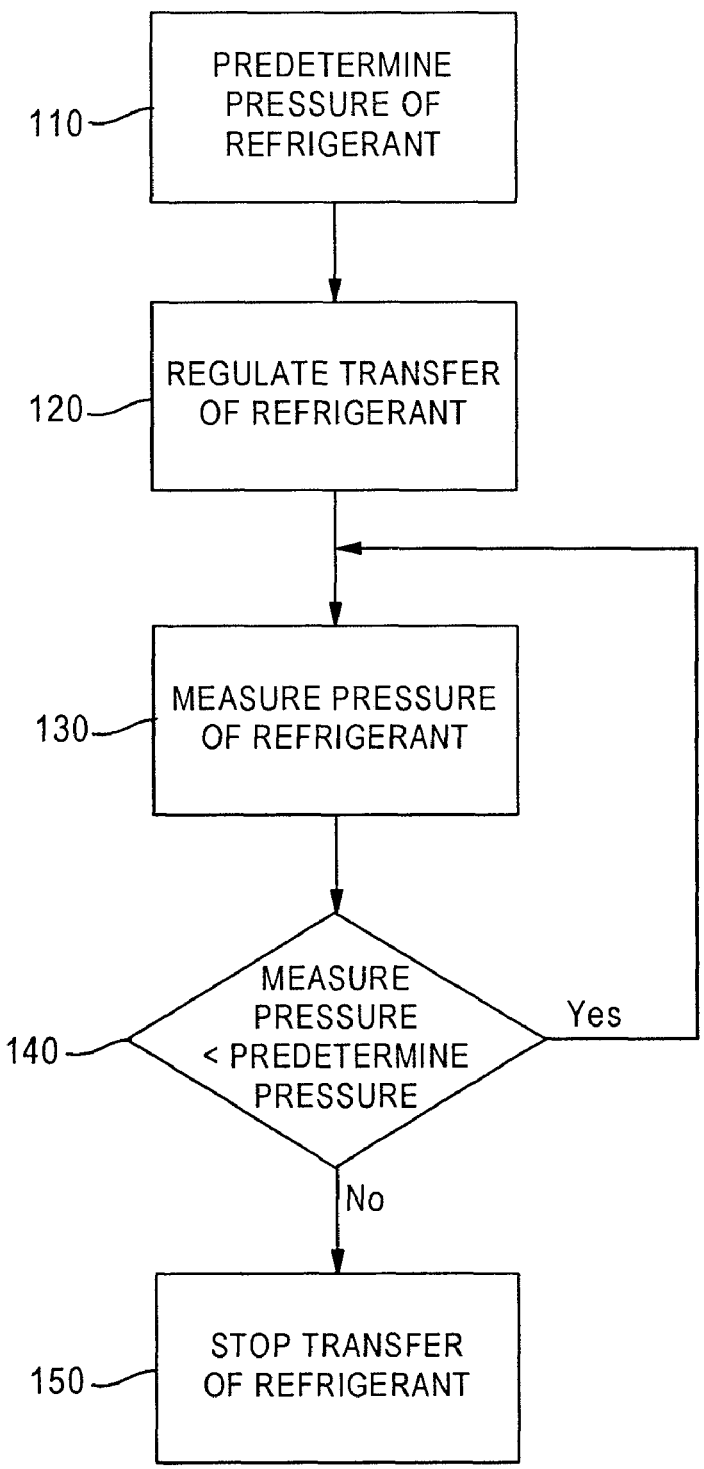
FIG. 2 is a flow chart of a method of charging a refrigeration system, according to the disclosure.

The operations of the refrigerant charging system 10 are schematically illustrated in the flow chart of FIG. 2. In an initial step 110, a required pressure of refrigerant to be charged into the refrigeration system of the vehicle 32 is predetermined. Many techniques of predetermining the pressure of refrigerant to be introduced into a refrigeration system are well known in the art, and the present methodology of charging a refrigeration system is not limited to any particular technique. For example, after flushing the refrigeration system of any remaining refrigerant, which may involve discharging any remaining refrigerant and pulling a vacuum within the refrigeration system, the pressure of the new refrigerant within the refrigeration system can be predefined for different temperatures by the manufacturer of the refrigeration system. The predetermined pressure is later used for comparing with a measured pressure of the refrigerant. Depending upon where the pressure of the refrigerant is measured, the predetermined pressure may vary from the pressure of the refrigerant in the refrigeration system defined by the manufacturer of the refrigeration system.

In step 120, refrigerant is transferred from the refrigerant source 12 to the refrigeration system of the vehicle 32, and the transfer of this refrigerant may be regulated using a pressure regulator 18 or the exit control valve 14. For example, the pressure regulator 18 reduces the pressure of the refrigerant exiting the refrigerant source 12 to a pressure compatible with the predetermined pressure. Alternatively, the operation of the exit control valve 14 can be used to stop or allow flow of refrigerant into the refrigeration system.

After the flow of refrigerant into the refrigeration system has been initiated and regulated, in step 130, the pressure of the refrigerant is measured using a sensor 19, located, for example, between and including the refrigeration system and the pressure regulator 18 or exit control valve 14. In step 140, this measured pressure (adjusted for temperature) is compared to the predetermined pressure. When the measured pressure equals or exceeds the predetermined pressure, the flow of refrigerant from the refrigerant source 12 to the refrigeration system is stopped.

Through use of the present refrigerant charging system, refrigerant can be charged into a refrigeration system with comparable or improved accuracy than prior technology used for the same purpose. Also, since the present refrigerant charging system can function without mass flow technology, the present refrigerant charging system is less expensive than those systems that employ mass flow technology and has increased accuracy, such as with vapor-phase refrigerants (e.g., carbon dioxide). Furthermore, since the present refrigerant charging system does not employ a load cell, the system is less sensitive to vibration, which has been a source of inaccuracy with prior systems that employ a load cell.

The disclosed concepts may be practiced by employing conventional methodology and equipment. Accordingly, the details of such equipment and methodology are not set forth herein in detail. In the previous descriptions, numerous specific details are set forth, such as specific formulas, processes, techniques, etc., in order to provide a thorough understanding of the present invention. However, it should be recognized that the present invention may be practiced without resorting to the details specifically set forth.

Only an exemplary aspect of the present disclosure and but a few examples of its versatility are shown and described. It is to be understood that the present invention is capable of use in various other combinations and environments and is capable of changes or modifications within the scope of the inventive concept as expressed herein.

What is claimed is:

1. A refrigeration charging system for charging a refrigeration system of a vehicle with a vapor-phase refrigerant, comprising:
    a refrigerant source for storing the vapor-phase refrigerant;
    an input line connected to the refrigerant source and configured to be connected to the refrigeration system of the vehicle;
    a sensor for detecting a pressure of the vapor-phase refrigerant being introduced into the refrigeration system of the vehicle from the input line;
    a control valve between the refrigerant source and the refrigeration system of the vehicle;
    a controller connected to the control valve and the sensor, wherein during a refrigeration charging operation, the controller is configured to close the control valve directly responsive to a pressure of the refrigerant in the refrigeration system of the vehicle detected by the sensor reaching a predetermined pressure;
    a pressure regulator fluidly connected between the refrigeration system and the control valve, the pressure regulator connected to the controller, wherein the controller is configured to adjust the pressure regulator for regulating the pressure of the vapor-phase refrigerant being introduced into the refrigeration system of the vehicle and set to a predetermined pressure corresponding to a pressure of refrigerant needed to charge the refrigeration system;
    a high-pressure-side gauge for indicating pressure of the refrigerant entering a high-pressure-side of the pressure regulator; and
    a low-pressure-side gauge for adjusting and monitoring pressure of the refrigerant leaving the pressure regulator.

2. The refrigeration system according to claim 1, wherein the vapor-phase refrigerant is carbon dioxide.

3. A refrigeration charging system for charging a refrigeration system of a vehicle with a vapor-phase refrigerant, comprising:
    a refrigerant source for storing the vapor-phase carbon dioxide;
    an input line connected to the refrigerant source and configured to be connected to the refrigeration system of the vehicle;
    a pressure regulator for regulating a pressure of the vapor-phase refrigerant being introduced into the refrigeration system of the vehicle via the input line and set to a predetermined pressure corresponding to a pressure of refrigerant needed to charge the refrigeration system;
    a high-pressure-side gauge for indicating pressure of the refrigerant entering a high-pressure-side of the pressure regulator;
    a low-pressure-side gauge for adjusting and monitoring pressure of the refrigerant leaving the pressure regulator;
    a sensor for detecting a pressure of the vapor-phase refrigerant being introduced into the refrigeration system of the vehicle from the input line;
    a control valve between the refrigerant source and the pressure regulator; and
    a controller connected to the control valve, the pressure regulator, and the sensor, wherein during a refrigeration charging operation, the controller is configured to close the control valve directly responsive to a pressure of the refrigerant in the refrigeration system of the vehicle detected by the sensor reaching a predetermined pressure and to adjust the pressure regulator.

4. A method of charging a refrigeration system of a vehicle with a vapor-phase refrigerant, comprising the steps of:
    connecting a pressure sensor to the refrigeration system of the vehicle;
    predetermining a pressure of the vapor-phase refrigerant based upon the refrigeration system of the vehicle being fully charged;
    setting a pressure regulator to the predetermined pressure;
    transferring vapor-phase refrigerant from a refrigerant source through an input line, and also through a control valve prior to the pressure regulator, to the refrigeration system of the vehicle;
    regulating the pressure of the refrigerant being introduced into the refrigeration system of the vehicle;
    indicating pressure of the refrigerant entering a high-pressure-side of the pressure regulator with a high-pressure-side gauge; and
    adjusting and monitoring pressure of the refrigerant leaving the pressure regulator with a low-pressure-side gauge electronically controlled by a controller;
    measuring a pressure of the vapor-phase refrigerant in the refrigeration system of the vehicle using the pressure sensor connected to the controller; and
    stopping the transfer of vapor-phase refrigerant to the refrigeration system of the vehicle with the control valve electronically controlled by the controller directly responsive to the measured pressure of the vapor-phase refrigerant in the refrigeration system of the vehicle equaling or exceeding the predetermined pressure.

5. The method according to claim 4, wherein the vapor-phase refrigerant is carbon dioxide.

* * * * *